United States Patent
Boardman

(10) Patent No.: US 12,247,521 B2
(45) Date of Patent: Mar. 11, 2025

(54) SELECTIVE STEAM DISTRIBUTION TO STEAM COOLED ZONES IN A TURBINE ENGINE

(71) Applicant: Raytheon Technologies Corporation, Farmington, CT (US)

(72) Inventor: Gregory Boardman, Owens Cross Roads, AL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/120,830

(22) Filed: Mar. 13, 2023

(65) Prior Publication Data
US 2024/0309814 A1 Sep. 19, 2024

(51) Int. Cl.
*F02C 7/18* (2006.01)
*F02C 9/18* (2006.01)

(52) U.S. Cl.
CPC .................. *F02C 7/18* (2013.01); *F02C 9/18* (2013.01); *F05D 2260/2322* (2013.01)

(58) Field of Classification Search
CPC ...... F02C 7/16; F02C 7/18; F02C 9/18; F02C 6/18; F23R 3/283; F05D 2260/2322
See application file for complete search history.

(56) References Cited

U.S. PATENT DOCUMENTS

| | | | |
|---|---|---|---|
| 4,819,438 A | 4/1989 | Schultz | |
| 6,173,561 B1 | 1/2001 | Sato | |
| 6,311,471 B1 | 11/2001 | Waldherr | |
| 6,341,485 B1 * | 1/2002 | Liebe | F23R 3/002 60/800 |
| 7,523,603 B2 * | 4/2009 | Hagen | F01K 21/047 422/607 |
| 8,813,473 B2 | 8/2014 | Fletcher | |
| 2001/0037646 A1 * | 11/2001 | Shimizu | F23M 5/08 60/752 |
| 2002/0062639 A1 * | 5/2002 | Tanaka | F02C 7/16 60/39.182 |
| 2002/0146317 A1 | 10/2002 | Tanioka | |
| 2003/0037534 A1 * | 2/2003 | Sugishita | F01K 23/106 60/39.182 |
| 2011/0030335 A1 * | 2/2011 | Sanchez | F01D 25/12 60/39.182 |
| 2016/0313007 A1 * | 10/2016 | Martini | F23R 3/283 |
| 2016/0326915 A1 | 11/2016 | Baladi | |
| 2017/0176014 A1 | 6/2017 | Hughes | |

FOREIGN PATENT DOCUMENTS

EP 4056810 A2 9/2022

OTHER PUBLICATIONS

EP Search Report for EP Patent Application No. 24151944.6 dated Aug. 1, 2024.

\* cited by examiner

*Primary Examiner* — David P. Olynick
(74) *Attorney, Agent, or Firm* — Getz Balich LLC

(57) ABSTRACT

A control method is provided during which a turbine engine is operated. The turbine engine includes a plurality of steam cooled zones along a flowpath within the turbine engine. Steam is distributed between the steam cooled zones based on a first distribution while the turbine engine is operating in a first mode. The steam is distributed between the steam cooled zones based on a second distribution while the turbine engine is operating in a second mode. The second distribution is different than the first distribution.

20 Claims, 9 Drawing Sheets

SELECTIVE STEAM DISTRIBUTION TO STEAM COOLED ZONES IN A TURBINE ENGINE

This invention was made with Government support under DE-AR0001561 awarded by the Department of Energy, Office of ARPA-E. The Government has certain rights in this invention.

BACKGROUND OF THE DISCLOSURE

1. Technical Field

This disclosure relates generally to a turbine engine and, more particularly, to utilizing steam during operation of the turbine engine.

2. Background Information

As government emissions standards tighten, interest in alternative fuels for gas turbine engines continues to grow. There is interest, for example, in fueling a gas turbine engine with hydrogen ($H_2$) fuel rather than a traditional hydrocarbon fuel such as kerosine to reduce greenhouse emissions. Combustion products produced by combusting hydrogen ($H_2$) fuel include water vapor. Various systems and methods are known in the art for recovering the water vapor. Various system and methods are also known in the art for producing and utilizing steam from the recovered water vapor. While these known systems and methods have various advantages, there is still room in the art for improvement.

SUMMARY OF THE DISCLOSURE

According to an aspect of the present disclosure, a control method is provided during which a turbine engine is operated. The turbine engine includes a plurality of steam cooled zones along a flowpath within the turbine engine. Steam is distributed between the steam cooled zones based on a first distribution while the turbine engine is operating in a first mode. The steam is distributed between the steam cooled zones based on a second distribution while the turbine engine is operating in a second mode. The second distribution is different than the first distribution.

According to another aspect of the present disclosure, another control method is provided during which fuel is injected into a combustion chamber of a combustor of a turbine engine. The fuel is injected into the combustion chamber at a first flowrate during a first power setting. The fuel is injected into the combustion chamber at a second flowrate during a second power setting. The second flowrate is different than the first flowrate. The fuel is combusted within the combustion chamber. Steam is distributed between a plurality of steam cooled zones which include a first zone and a second zone. The steam is distributed according to a first ratio between the first zone and the second zone during the first power setting. The steam is distributed according to a second ratio between the first zone and the second zone during the second power setting. The second ratio is different than the first ratio.

According to still another aspect of the present disclosure, an assembly is provided for a turbine engine. This assembly includes a combustor, a fuel system and a cooling system. The combustor includes a combustion chamber. The fuel system includes a fuel injector assembly arranged with the combustor. The fuel system is configured to inject fuel into the combustion chamber through the fuel injector assembly at a first flowrate during a first power setting and at a second flowrate during a second power setting. The first flowrate is different than the second flowrate. The cooling system includes a plurality of steam cooled zones arranged about the combustion chamber. The cooling system is configured to: distribute steam between the steam cooled zones based on a first distribution during the first power setting; and distribute the steam between the steam cooled zones based on a second distribution during the second power setting. The second distribution is different than the first distribution.

A first of the steam cooled zones includes a portion of the combustor.

The assembly may also include a structure arranged with the combustor. A first of the steam cooled zones may include at least a portion of the structure.

The steam cooled zones may include a first zone and a second zone. The first distribution may provide a first ratio of the steam distributed between the first zone and the second zone. The second distribution may provide a second ratio of the steam distributed between the first zone and the second zone. The second ratio may be different than the first ratio.

The steam cooled zones may also include a third zone. The first ratio may be a ratio of the steam distributed between the first zone, the second zone and the third zone. The second ratio may be a ratio of the steam distributed between the first zone, the second zone and the third zone.

The steam cooled zones may include a first zone and a second zone. The first distribution may provide the steam to the first zone and not to the second zone. In addition or alternatively, the second distribution may provide the steam to the second zone and not to the first zone.

The steam cooled zones may include a first zone. The first distribution may provide a first flowrate of the steam to the first zone. The second distribution may provide a second flowrate of the steam to the first zone. The second flowrate of the steam to the first zone may be different than the first flowrate of the steam to the first zone.

The steam cooled zones may also include a second zone. The first distribution may provide a first flowrate of the steam to the second zone. The second distribution may provide a second flowrate of the steam to the second zone. The second flowrate of the steam to the second zone may be different than the first flowrate of the steam to the second zone.

The second flowrate of the steam to the first zone may be greater than the first flowrate of the steam to the first zone. The second flowrate of the steam to the second zone may be greater than the first flowrate of the steam to the second zone.

The second flowrate of the steam to the first zone may be greater than the first flowrate of the steam to the first zone. The second flowrate of the steam to the second zone may be less than the first flowrate of the steam to the second zone.

The steam cooled zones may also include a second zone. The first distribution may provide a first flowrate of the steam to the second zone. The second distribution may provide a second flowrate of the steam to the second zone. The second flowrate of the steam to the second zone may be equal to the first flowrate of the steam to the second zone.

A first of the steam cooled zones may include at least a portion of a fuel injector assembly.

A first of the steam cooled zones may include at least a portion of a combustor bulkhead.

A first of the steam cooled zones may include at least a portion of a combustor wall.

A first of the steam cooled zones may include at least a portion of a stator vane array downstream of a combustion chamber along the flowpath.

A first of the steam cooled zones may include a first portion of a structure of the turbine engine along the flowpath. A second of the steam cooled zones may include a second portion of the structure of the turbine engine along the flowpath.

The operating of the turbine engine may include injecting fuel into a combustor of the turbine engine at a first flowrate during the first mode. The operating of the turbine engine may include injecting fuel into the combustor at a second flowrate during the second mode. The second flowrate may be different than the first flowrate.

A first of the steam cooled zones may be symmetrically cooled with the steam about a centerline during the operating of the turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
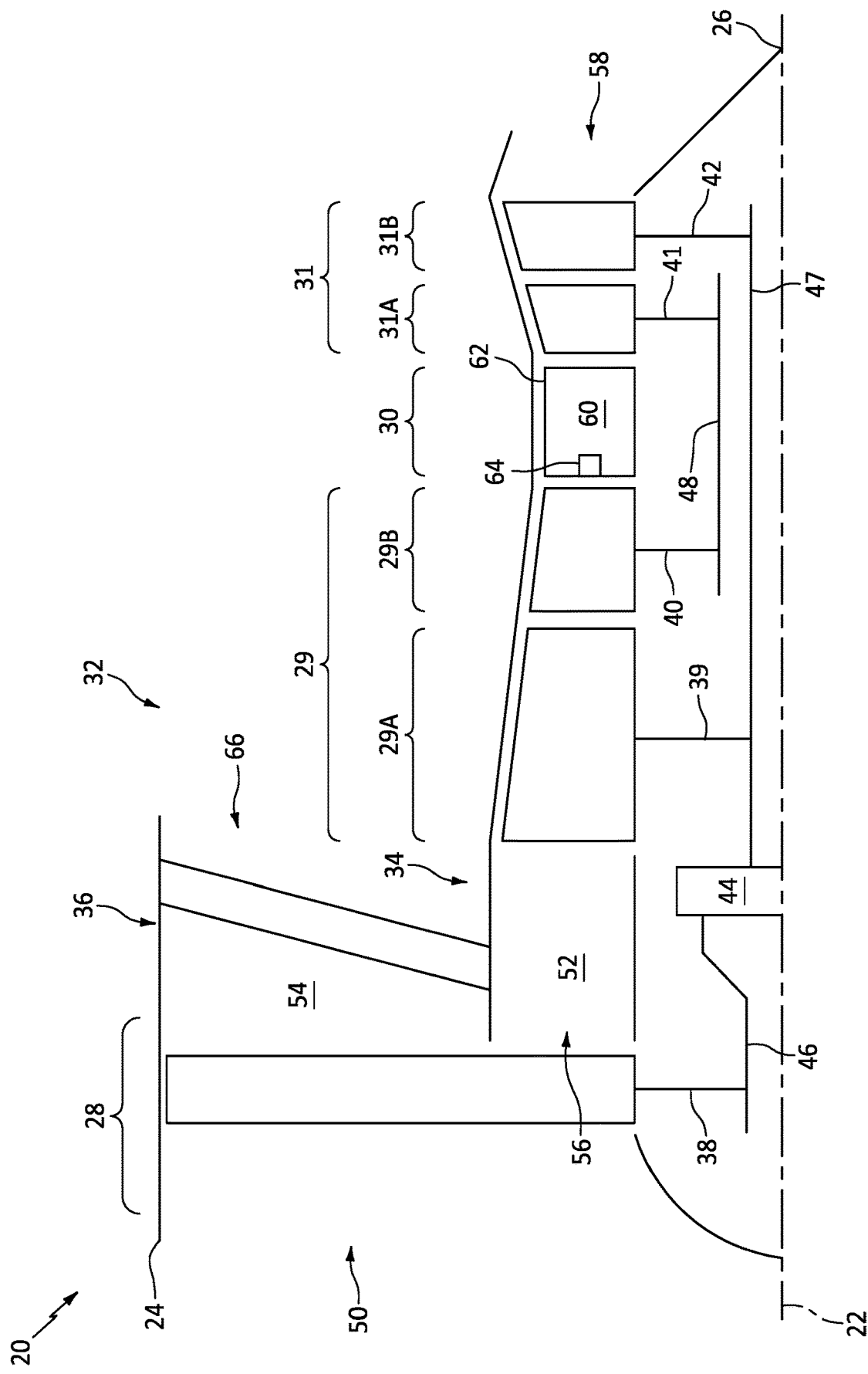
FIG. 1 is a partial schematic illustration of a gas turbine engine.

FIG. 1 is a side sectional illustration of a gas turbine engine 20 for an aircraft propulsion system. This turbine engine 20 extends axially along an axial centerline 22 between a forward, upstream end 24 and an aft, downstream end 26. The turbine engine 20 includes a fan section 28, a compressor section 29, a combustor section 30 and a turbine section 31. The compressor section 29 of FIG. 1 includes a low pressure compressor (LPC) section 29A and a high pressure compressor (HPC) section 29B. The turbine section 31 of FIG. 1 includes a high pressure turbine (HPT) section 31A and a low pressure turbine (LPT) section 31B.

The engine sections 28-31B of FIG. 1 are arranged sequentially along the axial centerline 22 within an engine housing 32. This engine housing 32 includes an inner case 34 (e.g., a core case) and an outer case 36 (e.g., a fan case). The inner case 34 may house one or more of the engine sections 29A-31B; e.g., a core of the turbine engine 20. The outer case 36 may house at least the fan section 28.

Each of the engine sections 28, 29A, 29B, 31A and 31B includes a respective bladed rotor 38-42. Each of these bladed rotors 38-42 includes a plurality of rotor blades arranged circumferentially around and connected to one or more respective rotor disks and/or hubs. The rotor blades, for example, may be formed integral with or mechanically fastened, welded, brazed, adhered and/or otherwise attached to the respective rotor disk(s) and/or the respective hub(s).

The fan rotor 38 is connected to a geartrain 44, for example, through a fan shaft 46. The geartrain 44 and the LPC rotor 39 are connected to and driven by the LPT rotor 42 through a low speed shaft 47. The HPC rotor 40 is connected to and driven by the HPT rotor 41 through a high speed shaft 48. The engine shafts 46-48 are rotatably supported by a plurality of bearings; e.g., rolling element and/or thrust bearings. Each of these bearings is connected to the engine housing 32 by at least one stationary structure such as, for example, an annular support strut.

During engine operation, air enters the turbine engine 20 through an airflow inlet 50 into the turbine engine 20. This air is directed through the fan section 28 and into a core flowpath 52 and a bypass flowpath 54. The core flowpath 52 extends sequentially through the engine sections 29A-31B (e.g., the engine core) from an inlet 56 into the core flowpath 52 to an exhaust 58 from the core flowpath 52. The air within the core flowpath 52 may be referred to as "core air". The bypass flowpath 54 extends through a bypass duct, and bypasses the engine core. The air within the bypass flowpath 54 may be referred to as "bypass air".

The core air is compressed by the LPC rotor 39 and the HPC rotor 40 and directed into a (e.g., annular) combustion chamber 60 of a (e.g., annular) combustor 62 in the combustor section 30. Fuel is injected by one or more fuel injector assemblies 64 (one visible in FIG. 1) into the combustion chamber 60 and mixed with the compressed core air to provide a fuel-air mixture. This fuel-air mixture is ignited and combustion products thereof flow through and sequentially cause the HPT rotor 41 and the LPT rotor 42 to rotate before being directed out of the turbine engine 20 through the core exhaust 58. The rotation of the HPT rotor 41 and the LPT rotor 42 respectively drive rotation of the HPC rotor 40 and the LPC rotor 39 and, thus, compression of the air received from the core inlet 56. The rotation of the LPT rotor 42 also drives rotation of the fan rotor 38, which propels the bypass air through the bypass flowpath 54 and out of the turbine engine 20 through an exhaust 66 from the bypass flowpath 54. The propulsion of the bypass air may account for a majority of thrust generated by the turbine engine 20.

Figure 2:
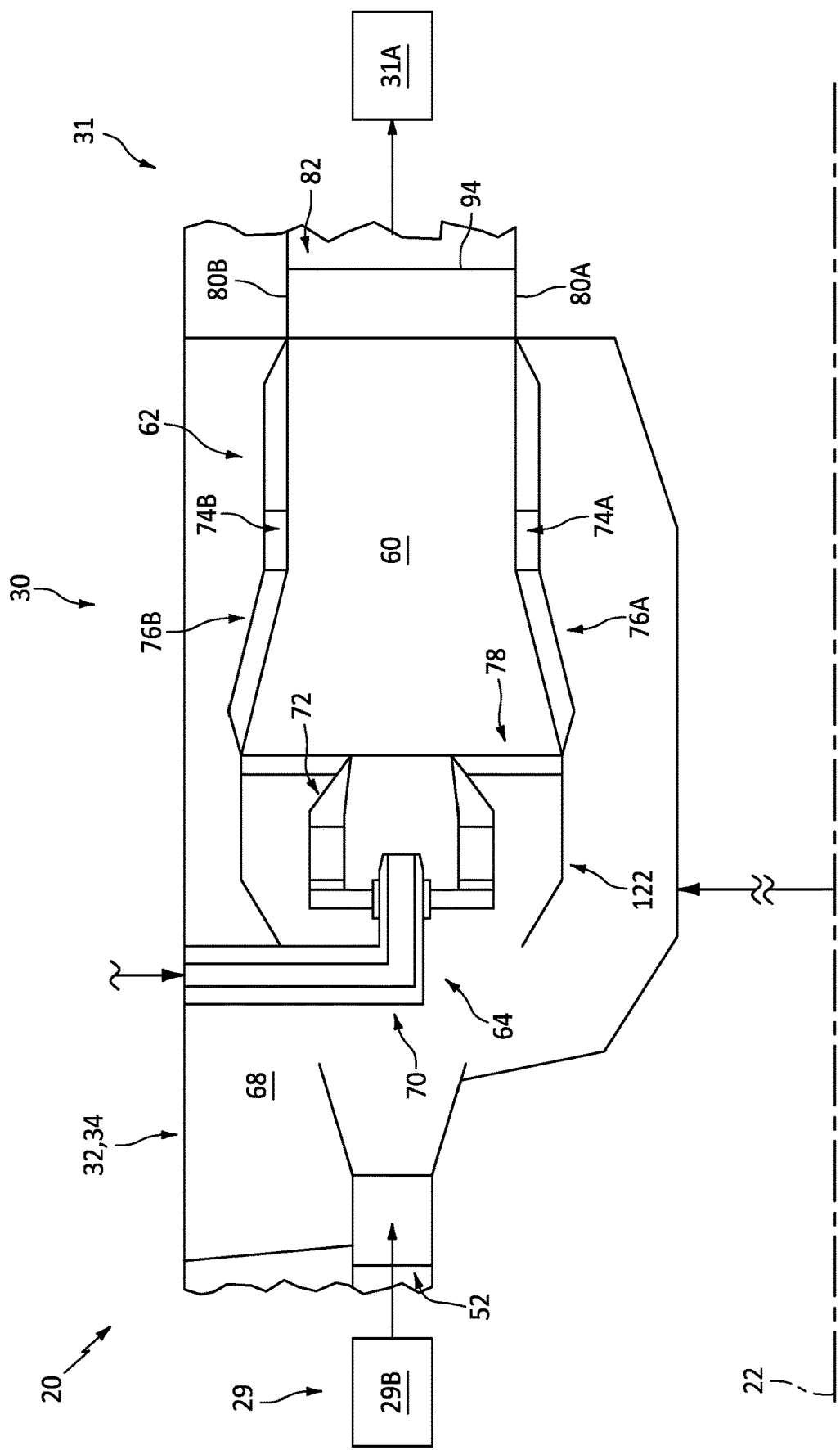
FIG. 2 is a partial schematic illustration of a combustor section between a compressor section and a turbine section.

FIG. 2 illustrate a portion of the combustor section 30 along the core flowpath 52 between the HPC section 29B and the HPT section 31A. This combustor section 30 includes the combustor 62, a diffuser plenum 68 and the one or more injector assemblies 64 (one visible in FIG. 2). Briefly, the combustor 62 is disposed within (e.g., surrounded by) the diffuser plenum 68. This diffuser plenum 68 receives the compressed core air from the HPC section 29B for subsequent provision into the combustion chamber 60. Each injector assembly 64 of FIG. 2 includes a fuel injector 70 mated with an air swirler structure 72. The fuel injector 70 injects the fuel into the combustion chamber 60. The air swirler structure 72 directs some of the core air from the diffuser plenum 68 into the combustion chamber 60 in a manner that facilitates mixing the core air with the injected fuel. One or more igniters (not shown) ignite the fuel-air mixture within the combustion chamber 60. One or more quench apertures 74A, 74B (generally referred to as "74") (e.g., dilution holes) in each wall 76A, 76B (generally referred to as "76") of the combustor 62 direct additional core air from the diffuser plenum 68 into the combustion chamber 60 to quench (e.g., stoichiometrically lean) the combustion products; e.g., the ignited fuel-air mixture.

Figure 3:
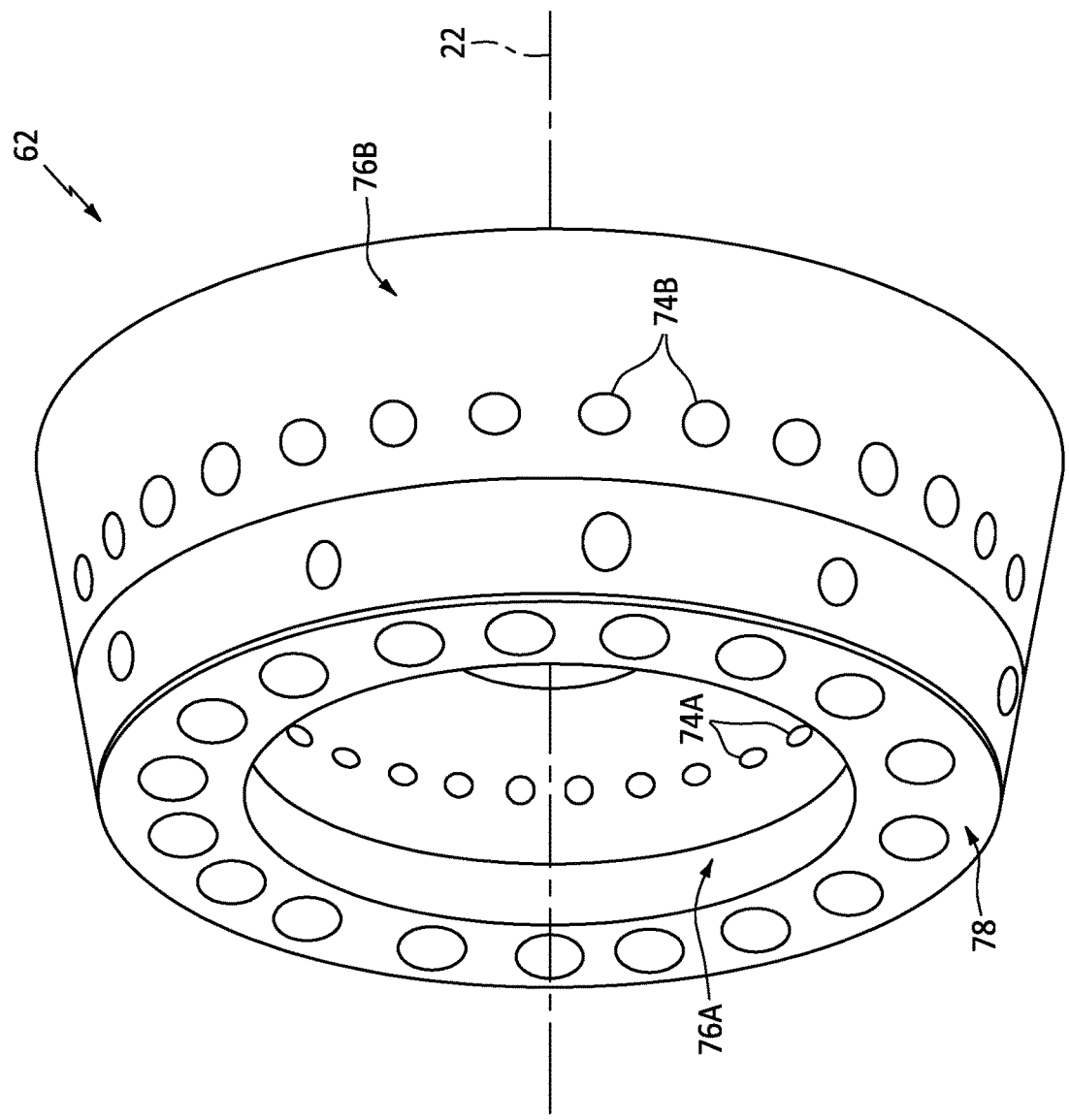
FIG. 3 is a perspective illustration of a combustor.

The combustor 62 may be configured as an annular combustor; e.g., an annular floating wall combustor. The combustor 62 of FIGS. 2 and 3, for example, includes an annular combustor bulkhead 78, the tubular inner combustor wall 76A ("inner wall"), and the tubular outer combustor wall 76B ("outer wall"). The bulkhead 78 of FIG. 2 extends radially between and to the inner wall 76A and the outer wall 76B. The bulkhead 78 may be connected (e.g., mechanically fastened or otherwise attached) to the inner wall 76A and/or the outer wall 76B. Each combustor wall 76 projects axially along the axial centerline 22 out from the bulkhead 78 towards the HPT section 31A. The inner wall 76A of FIG. 2, for example, projects axially to and may be connected to an inner platform 80A of a downstream stator vane array 82 (e.g., a turbine inlet nozzle) in the HPT section 31A. The outer wall 76B of FIG. 2 projects axially to and may be connected to an outer platform 80B of the downstream stator vane array 82. With the arrangement of FIG. 2, the combustion chamber 60 is formed by and extends radially within the combustor 62 between and to the inner wall 76A and the outer wall 76B. The combustion chamber 60 is formed by and extends axially (in an upstream direction along the core flowpath 52) into the combustor 62 from the stator vane array 82 to the bulkhead 78. The combustion chamber 60 also extends within the combustor 62 circumferentially about (e.g., completely around) the axial centerline 22, which may configure the combustion chamber 60 as a full-hoop annulus.

Figure 4:
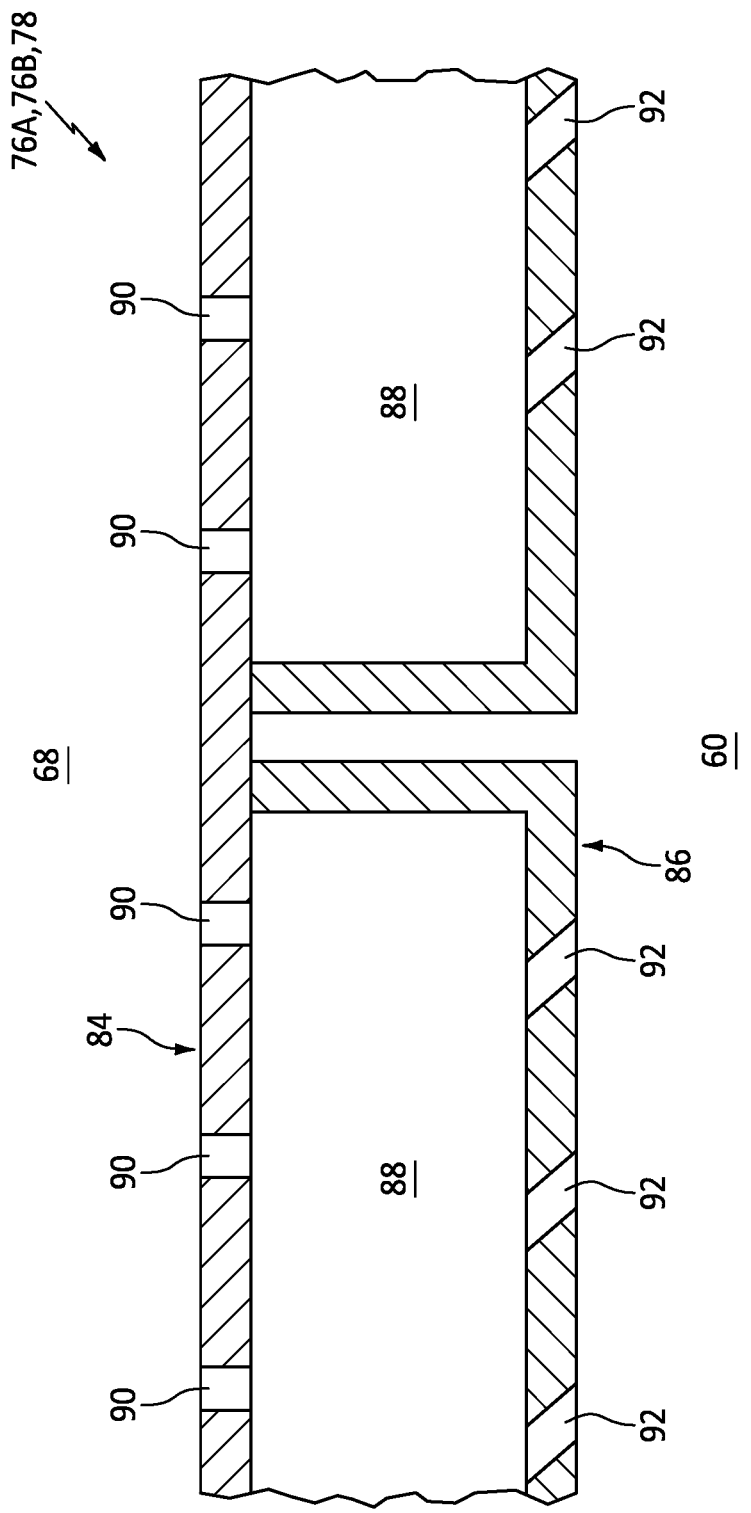
FIG. 4 is a partial sectional illustration of a combustor wall.

Any one or more or all of the walls 76A, 76B, 78 may each be configured as a multi-walled structure; e.g., a hollow, dual-walled structure. For example, referring to FIG. 4, each wall 76A, 76B, 78 includes a combustor wall shell 84, a combustor wall heat shield 86 (e.g., a liner) and one or more combustor wall cooling cavities 88 (e.g., impingement cavities) formed by and (e.g., radially and/or axially) between the shell 84 and the heat shield 86. Each cooling cavity 88 of FIG. 4 is fluidly coupled with the diffuser plenum 68 through one or more cooling apertures 90 in the shell 84; e.g., impingement apertures. Each cooling cavity 88 of FIG. 4 is fluidly coupled with the combustion chamber 60 through one or more cooling apertures 92 in the heat shield 86; e.g., effusion apertures. Of course, various other multi-walled combustor wall structures are known in the art, and the present disclosure is not limited to any particular ones thereof. Furthermore, it is contemplated any one or more or all of the walls 76A, 76B and/or 78 of FIG. 2 may each alternatively be configured as a single-walled structure. The shell 84 of FIG. 4, for example, may be omitted and the heat shield 86 may form a single walled liner/wall. However, for ease of description, each wall 76A, 76B, 78 may each be described below as the hollow, dual-walled structure.

Referring to FIG. 2, the stator vane array 82 includes the inner platform 80A, the outer platform 80B and a plurality of stator vanes 94 (one visible in FIG. 2); e.g., hollow stator vanes. The stator vanes 94 are arranged circumferentially about the axial centerline 22 in an array; e.g., a circular array. Each of these stator vanes 94 extends radially across the core flowpath 52 between and to the inner platform 80A and the outer platform 80B. Each of the stator vanes 94 may also be connected to the inner platform 80A and/or the outer platform 80B. The stator vane array 82 and its stator vanes 94 are configured to turn and/or otherwise condition the combustion products exiting the combustion chamber 60 for interaction with a first stage of the HPT rotor 41 (see FIG. 1).

Figure 5:
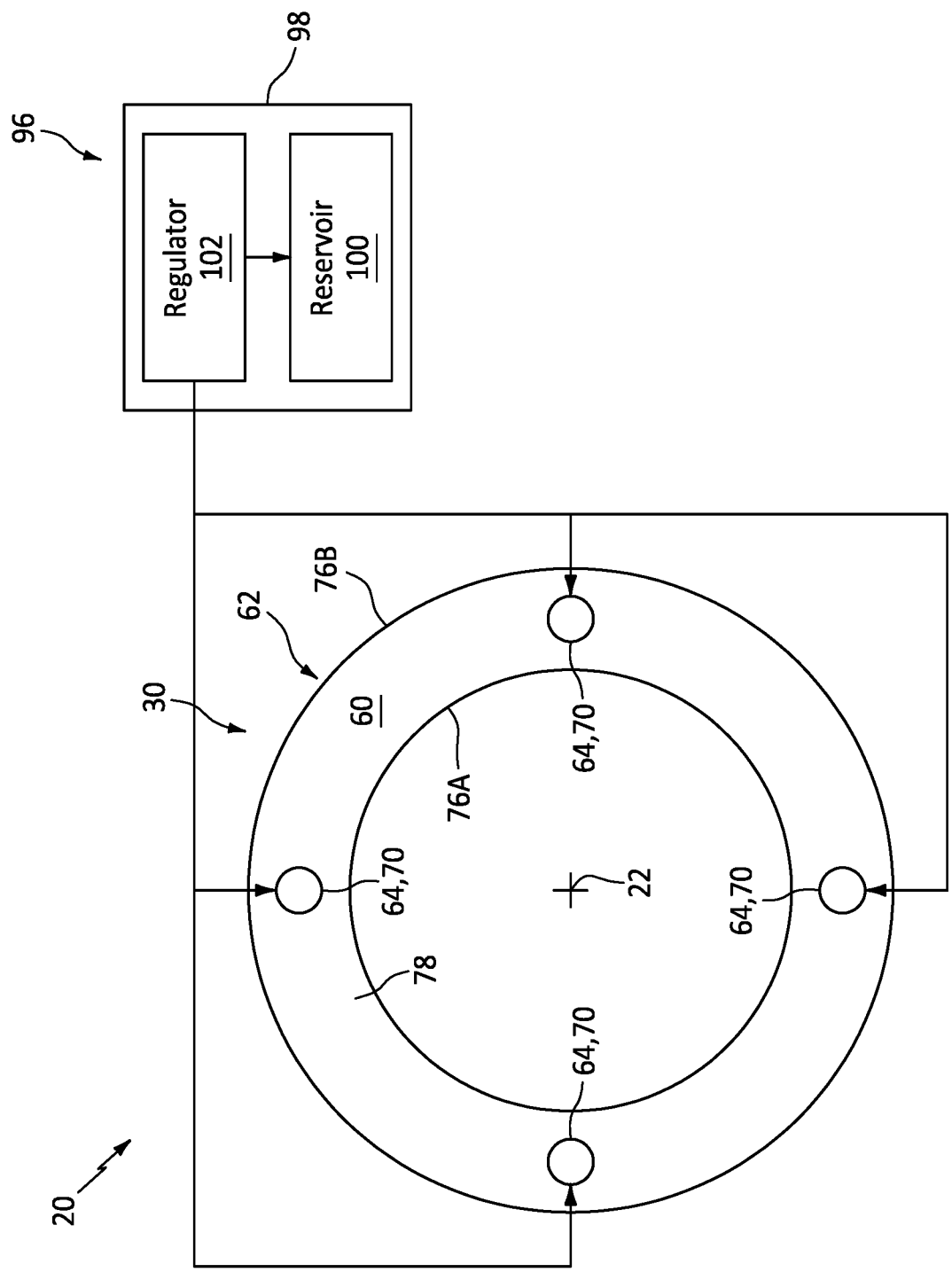
FIG. 5 is a schematic illustration of a fuel system configured with the combustor section.

Referring to FIG. 5, the turbine engine 20 includes a fuel system 96 for delivering the fuel to the combustor 62. This fuel system 96 includes a fuel source 98 and the one or more fuel injectors 70. The fuel source 98 of FIG. 5 includes a fuel reservoir 100 and/or a fuel flow regulator 102; e.g., a valve and/or a pump. The fuel reservoir 100 is configured to store the fuel before, during and/or after turbine engine operation. The fuel reservoir 100, for example, may be configured as or otherwise include a tank, a cylinder, a pressure vessel, a bladder or any other type of fuel storage container. The fuel flow regulator 102 is configured to direct and/or meter a flow of the fuel from the fuel reservoir 100 to one or more or all of the fuel injectors 70. The fuel injectors 70 may be arranged circumferentially about the axial centerline 22 in an array. Each fuel injector 70 is configured to direct the fuel received from the fuel source 98 into the combustion chamber 60 for combustion.

The fuel delivered by the fuel system 96 may be a non-hydrocarbon fuel; e.g., a hydrocarbon free fuel. Examples of the non-hydrocarbon fuel include, but are not limited to, hydrogen fuel (e.g., hydrogen ($H_2$) gas) and ammonia fuel (e.g., ammonia ($NH_3$) gas). The turbine engine 20 of FIG. 1 may thereby be configured as a non-hydrocarbon turbine engine; e.g., a hydrocarbon free turbine engine. The present disclosure, however, is not limited to non-hydrocarbon turbine engines. The fuel delivered by the fuel system 96, for example, may alternatively be a hydrocarbon fuel such as, but not limited to, kerosene or jet fuel. The turbine engine 20 of FIG. 1 may thereby be configured as a hydrocarbon turbine engine. Alternatively, the fuel system 96 may be configured as a multi-fuel system operable to deliver, individually or in combination, multiple different fuels (e.g., a non-hydrocarbon fuel and a hydrocarbon fuel, etc.) for combustion within the combustion chamber 60. The turbine engine 20 of FIG. 1 may thereby be configured as a multi-fuel turbine engine; e.g., a dual-fuel turbine engine. However, for ease of description, the fuel delivered by the fuel system 96 may be described below as the non-hydrocarbon fuel; e.g., the hydrogen fuel.

Referring to FIG. 2, throughout an engine cycle, turbine engine components (e.g., 76A, 76B, 78 and/or 94) along the core flowpath 52 and/or about the combustion chamber 60 may be subject to varying thermal loads and stresses. These varying thermal loads and stresses may be exacerbated with the use alternative fuels such as the non-hydrocarbon fuel; e.g., the hydrogen fuel. The thermal loads and stresses are elevated along zones subject to thermal hot spots; e.g., regions with locally elevated temperatures. Locations of these hot spots may change based on an operating mode of the turbine engine 20; e.g., a power setting of the turbine engine 20. For example, during aircraft cruise where the turbine engine 20 is at a relatively low power setting, the hot spots may form within/along certain region(s) of core flowpath 52 and its combustion chamber 60. By contrast, during aircraft takeoff where the turbine engine 20 is at a relatively high power setting, the hot spots may form within/along certain other (and/or overlapping) region(s) of the core flowpath 52 and its combustion chamber 60.

Figure 6:
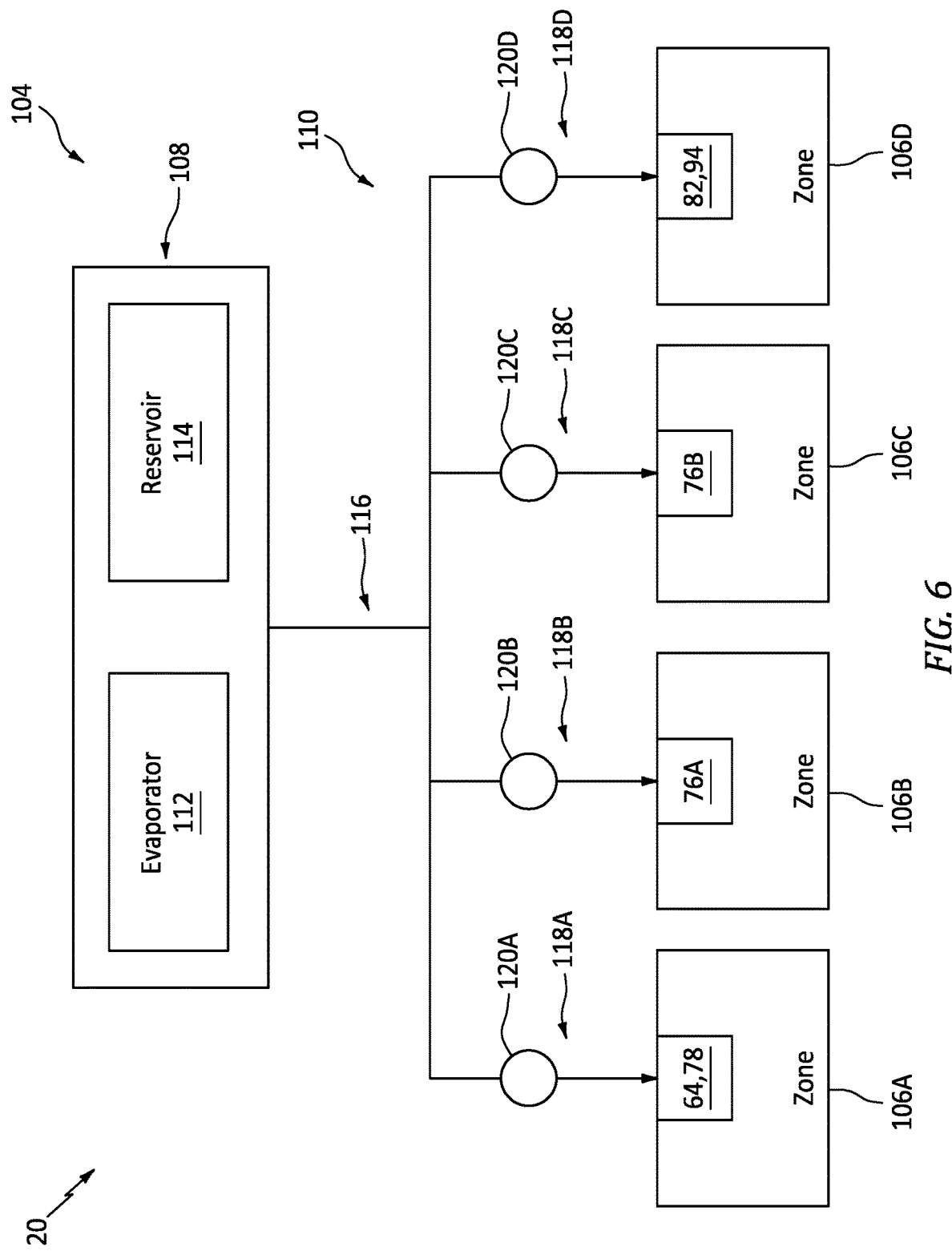
FIG. 6 is a schematic illustration of a cooling system.

Referring to FIG. 6, to mitigate the thermal loads and stresses associated with hot spots, the turbine engine 20 includes an adaptive cooling system 104. This cooling system 104 is configured to adaptively cool a plurality of zones 106A-D (generally referred to as "106") within the turbine engine 20 using steam. The steam cooled zones 106 are arranged along the core flowpath 52 (see FIG. 2) and/or about the combustion chamber 60 (see FIG. 2). The zone 106A, for example, may include at least a portion or an entirety of the combustor bulkhead 78 and/or the injector assemblies 64. The zone 106B may include at least a portion or an entirety of the inner wall 76A. The zone 106C may include at least a portion or an entirety of the outer wall 76B. The zone 106D may include at least a portion or an entirety of the stator vane array 82; e.g., the stator vanes 94. The cooling system 104 of FIG. 6 includes a steam source 108, a steam delivery circuit 110 and the steam cooled zones 106.

The steam source 108 is configured to provide the steam to the steam delivery circuit 110 during turbine engine operation and, more particularly, during cooling system operation. The steam source 108, for example, may be configured as or otherwise include an evaporator 112, which may be or otherwise include a fluid-to-fluid heat exchanger and/or an electrical heater. The evaporator 112 is configured to evaporate water into the steam during the cooling system operation. The water may be received from various sources. The steam source 108 of FIG. 6, for example, includes a water reservoir 114 fluidly coupled with and upstream of the evaporator 112. This water reservoir 114 is configured to store the water before, during and/or after turbine engine operation. Examples of the water reservoir 114 include, but are not limited to, a tank, a cylinder, a pressure vessel, a bladder or any other type of water storage container. Briefly, the water may be supplied to the water reservoir 114 by recovering water vapor from the combustion products flowing through the core flowpath 52 (see FIG. 1) and/or from another water source onboard or offboard an aircraft.

The steam delivery circuit 110 of FIG. 6 includes a supply circuit 116 and a plurality of zone circuits 118A-D (generally referred to as "118"), where each of the zone circuits 118 is associated with a respective one of the steam cooled zones 106. The supply circuit 116 of FIG. 6 extends from an outlet from the steam source 108 to an interface with the zone circuits 118 such as a manifold. At this interface, the zone circuits 118 may be fluidly coupled in parallel to and downstream of the supply circuit 116. Each of the zone circuits 118 extends from the interface to a respective outlet from that zone circuit 118 into a respective one of the steam cooled zones 106. The steam delivery circuit 110 and each zone circuit 118 are thereby operable to direct the steam provided by the steam source 108 to the respective steam cooled zone 106.

The steam provided to each steam cooled zone 106A-D may be independently regulated by a steam flow regulator 120A-D (generally referred to as "120"). Each steam flow regulator 120 is arranged (e.g., fluidly coupled inline) with a respective one of the zone circuits 118. Each steam flow regulator 120 is configured to selectively direct and/or meter a flow of the steam from the steam source 108 to a respective one of the steam cooled zones 106. For example, each steam flow regulator 120 may be configured as or otherwise include a control valve. This control valve may fully open, may fully close and/or may move to one or more partially open positions. While each steam flow regulator 120 is illustrated in FIG. 6 as being part of the respective zone circuit 118, that steam flow regulator 120 may alternatively be arranged at the interface between the supply circuit 116 and the respective zone circuit 118, at the outlet from the respective zone circuit 118, or otherwise.

With the foregoing arrangement, steam flow to each steam cooled zone 106 may be independently regulated from the other steam cooled zones 106. This may facilitate tailored cooling of the various steam cooled zones 106 across the engine cycle. In particular, the steam may be selectively distributed between the steam cooled zones 106 based on, for example, cooling needs for those specific steam cooled zones 106. For example, where one or more of the steam cooled zones 106 are subject to hot spots, the steam flow regulators 120 for those respective steam cooled zones 106 may start directing the steam (or direct additional steam) thereto for additional cooling. By contrast, where one or more of the steam cooled zones 106 are not subject to hot spots, the steam flow regulators 120 for those respective steam cooled zones 106 may not direct any of the steam (or less steam) thereto.

As discussed above, the locations of the hot spots may change based on the operating mode of the turbine engine 20; e.g., the power setting of the turbine engine 20. For example, during one operating mode, the hot spot(s) within the combustion chamber 60 may be located at or towards the combustor bulkhead 78. The steam delivery circuit 110 may thereby direct more (or all) of the steam to the zone 106A. During another operating mode, the hot spot(s) within the combustion chamber 60 may be located midway between the combustor bulkhead 78 and the stator vane array 82. The steam delivery circuit 110 may thereby direct more (or all) of the steam to the zone 106B and/or the zone 106C. During still another operating mode, the hot spot(s) within the combustion chamber 60 may be located at or towards the stator vane array 82. The steam delivery circuit 110 may thereby direct more (or all) of the steam to the zone 106D. Thus, different operating modes may be associated with different steam distributions. Moreover, a ratio of the steam distributed between some or all of the steam cooled zones 106 may change depending on the operating mode.

The change in the ratio of the steam distribution between the respective steam cooled zones 106 may be implemented in various manners. For example, when increasing power, a flowrate of the steam to some or all of the steam cooled zones 106 may increase. However, the increase in the steam provided to one or more of the steam cooled zones 106 may be more than one or more of the other steam cooled zones 106. In another example, when decreasing power, a flowrate of the steam to some or all of the steam cooled zones 106 may decrease. However, the decrease in the steam to one or more of the steam cooled zones 106 may be more than one or more of the other steam cooled zones 106. In still another example, when changing power, the steam to one or more of the steam cooled zones 106 may be turned on (or the flowrate increased) while the steam to one or more of the other steam cooled zones 106 may be turned off (or the flowrate decreased). Thus, the steam provided to each steam cooled zone 106 may be specifically tailored to the engine operating mode and/or the engine power setting based on predicted hot spot location(s) for that engine operating mode and/or the engine power setting.

Figure 7:
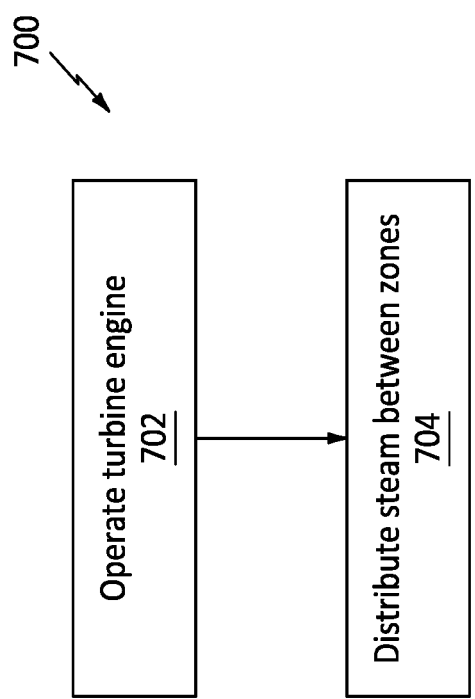
FIG. 7 is a flow diagram of a method for controlling operation of a gas turbine engine.

FIG. 7 is a flow diagram of a method 700 for controlling operation of a gas turbine engine. For ease of description, the control method 700 is described with respect to the turbine engine 20 of FIG. 1, the fuel system 96 of FIG. 5 and the cooling system 104 of FIG. 6. The control method 700 of the present disclosure, however, is not limited to such an exemplary arrangement.

In step 702, the turbine engine 20 is operated, for example, as described above. During this engine operation, the fuel is injected into the combustion chamber 60 at a flowrate corresponding to the operating mode of the turbine engine 20; e.g., the power setting of the turbine engine 20. For example, where the turbine engine 20 is operating at idle (e.g., an idle power setting), the fuel flowrate may be relatively low. Where the turbine engine 20 is operating for aircraft cruise (e.g., a low power setting), the fuel flowrate may be moderate. Where the turbine engine 20 is operating for aircraft takeoff (e.g., a high power setting), the fuel flowrate may be relatively high. During each of these modes of operation, the hot spots within the combustion chamber 60/along the core flowpath 52 may be located at (e.g., slightly) different locations.

In step 704, the steam is distributed between the steam cooled zones 106 based on the engine operating mode/the engine power setting. For example, where the turbine engine 20 is operating at idle, the steam delivery circuit 110 may distribute the steam between the steam cooled zones 106 according to an idle mode steam distribution. Where the turbine engine 20 is operating for aircraft cruise, the steam delivery circuit 110 may distribute the steam between the steam cooled zones 106 according to a cruise mode steam distribution. Where the turbine engine 20 is operating for aircraft takeoff, the steam delivery circuit 110 may distribute the steam between the steam cooled zones 106 according to a takeoff mode steam distribution. The distributions of steam between the steam cooled zones 106 during these different engine operating modes/engine power settings may be different as discussed above. Therefore, each respective operating mode/power setting may be associated with a unique ratio of the steam distribution between the steam cooled zones 106.

While the different steam cooled zones 106 received tailored steam cooling, each steam cooled zone 106 may be symmetrically cooled. For example, each steam cooled zone 106 may be symmetrically cooled about the axial centerline 22.

By tailoring steam cooling based on changing cooling needs of the turbine engine components (e.g., 76A, 76B, 78, 94), the cooling system 104 of the present disclosure may promote increased hot section durability. The tailored distribution of the steam may reduce or prevent component overheating and potentially obviate need to specialty high temperature materials for the turbine engine components (e.g., 76A, 76B, 78, 94). In addition, introducing steam into the combustion chamber 60 may reduce flame temperature and thereby reduce nitric oxide (NOx) production.

Figure 8:
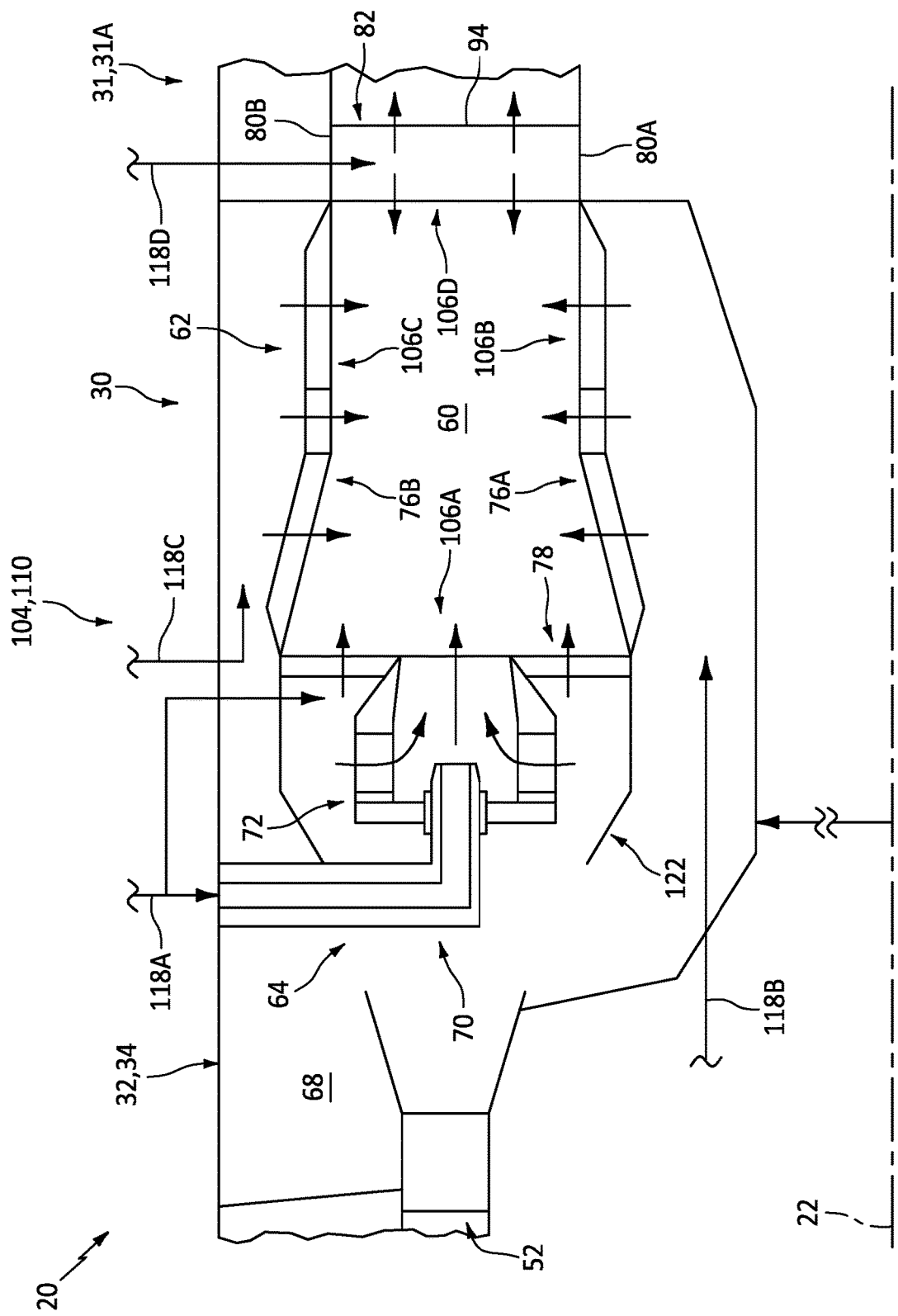
FIG. 8 is a partial schematic illustration of a portion of the gas turbine engine configured with a steam delivery circuit.

In some embodiments, referring to FIG. 8, the steam may be introduced into the zone 106A by injecting the steam into a volume between the combustor bulkhead 78 and a combustor hood 122. This steam may directly cool the combustor bulkhead 78 by contacting a backside of the combustor bulkhead 78 and/or flowing across the combustor bulkhead 78 via its cooling apertures and/or cooling cavities. The steam may also pass through the air swirler structures 72 and provide cooling within the combustion chamber 60. The steam may also or alternatively be injected with the fuel through the fuel injector 70.

In some embodiments, the steam may be introduced into the diffuser plenum 68 adjacent the inner wall 76A. This steam may directly cool the inner wall 76A by contacting a backside of the inner wall 76A and/or flowing across the inner wall 76A via its cooling apertures and/or cooling cavities.

In some embodiments, the steam may be introduced into the diffuser plenum 68 adjacent the outer wall 76B. This steam may directly cool the outer wall 76B by contacting a backside of the outer wall 76B and/or flowing across the outer wall 76B via its cooling apertures and/or cooling cavities.

In some embodiments, the steam may be introduced into an internal passage in each stator vane 94. The steam may then be effused through cooling apertures (e.g., effusion apertures) in a sidewall of each stator vane 94.

Figure 9:
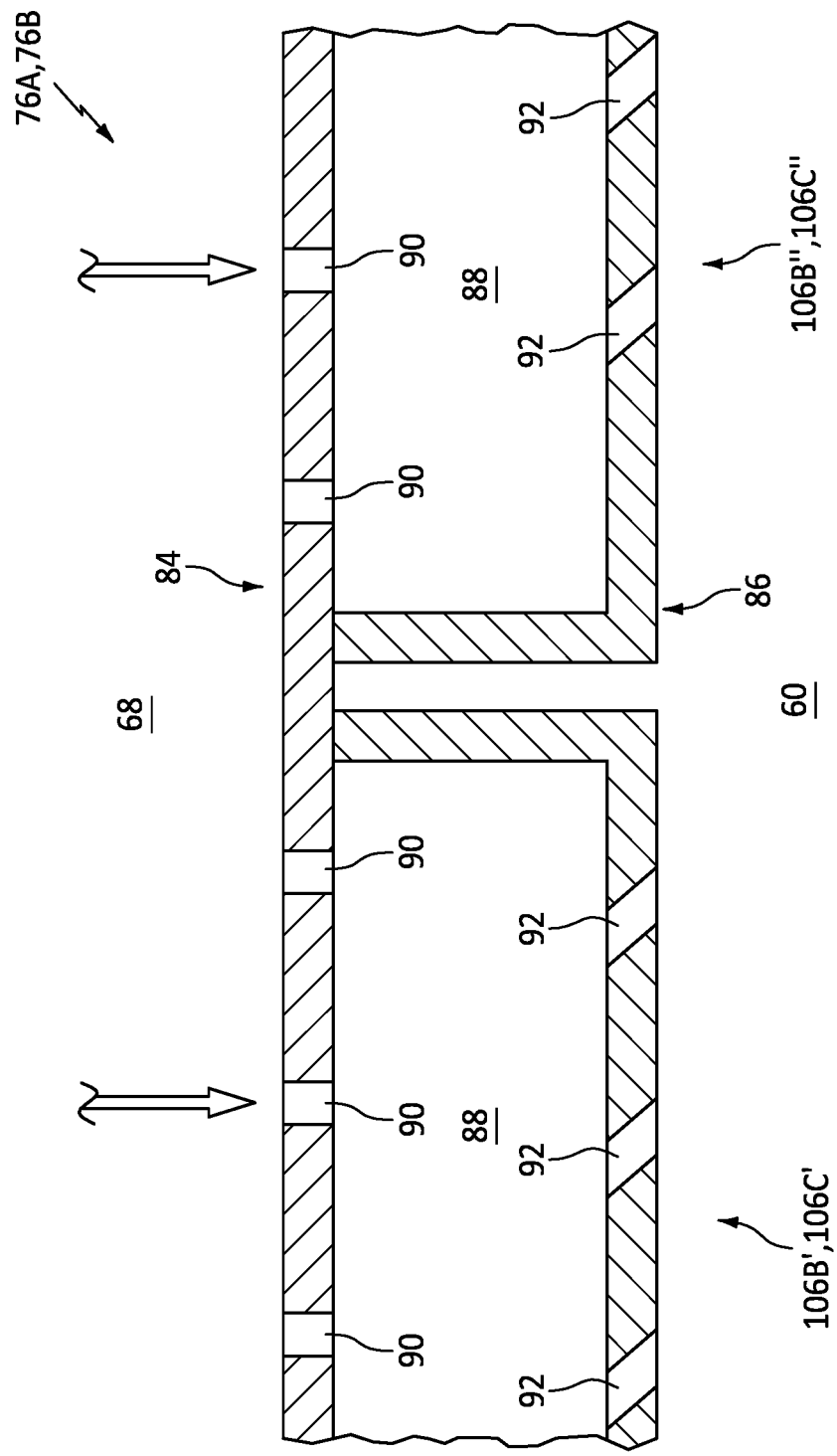
FIG. 9 is a partial sectional illustration of the combustor wall configured with multiple steam cooled zones.

In some embodiments, each combustor wall 76 may be included in a single steam cooled zone 106. In other embodiments, referring to FIG. 9, each combustor wall 76 may be associated with multiple steam cooled zones 106. One steam cooled zone 106B', 106C', for example, may include an upstream portion of the respective combustor wall 76A, 76B. Another steam cooled zone 106B", 106C" may include a downstream portion of the respective combustor wall 76A, 76B. Of course, a similar division may also or alternatively be implemented with other steam cooled structures of the turbine engine 20.

The cooling system 104 may be included in various turbine engines other than the one described above. The cooling system 104, for example, may be included in a geared turbine engine where a geartrain connects one or more shafts to one or more rotors in a fan section, a compressor section and/or any other engine section. Alternatively, the cooling system 104 may be included in a turbine engine configured without a geartrain; e.g., a direct drive turbine engine. The cooling system 104 may be included in a geared or non-geared turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A control method, comprising:
   operating a turbine engine, the turbine engine comprising a combustor section and a cooling system, the combustor section comprising a combustor and a combustion chamber extending radially within the combustor section between and to an inner wall of the combustor and an outer wall of the combustor, and the cooling system comprising a plurality of steam cooled zones arranged within the combustor section and about the combustion chamber, each of the steam cooled zones including a steam flow regulator and a portion of walls within the combustor;
   distributing steam, using the steam flow regulators, between the plurality of steam cooled zones to cool the portions of the walls within each zone, based on a first distribution while the turbine engine is operating in a first mode wherein the first distribution specifies a first amount of steam to cool the portion of the walls in each zone according to first thermal loads in each zone during the first operational mode; and
   distributing the steam between the plurality of steam cooled zones based on a second distribution while the turbine engine is operating in a second mode wherein the second distribution specifies a second amount of steam to cool the portion of the walls in each zone according to second thermal loads in each zone during the second operational mode, wherein the second distribution is different than the first distribution.

2. The control method of claim 1, wherein
the plurality of steam cooled zones include a first zone and a second zone;
the first distribution provides a first ratio of the steam distributed between the first zone and the second zone; and
the second distribution provides a second ratio of the steam distributed between the first zone and the second zone, and the second ratio is different than the first ratio.

3. The control method of claim 2, wherein
the plurality of steam cooled zones further include a third zone;
the first ratio is a ratio of the steam distributed between the first zone, the second zone and the third zone; and
the second ratio is a ratio of the steam distributed between the first zone, the second zone and the third zone.

4. The control method of claim 1, wherein the plurality of steam cooled zones include a first zone and a second zone, and at least one of
the first distribution provides the steam to the first zone and not to the second zone; or
the second distribution provides the steam to the second zone and not to the first zone.

5. The control method of claim 1, wherein
the plurality of steam cooled zones include a first zone;
the first distribution provides a first flowrate of the steam to the first zone; and
the second distribution provides a second flowrate of the steam to the first zone, and the second flowrate of the steam to the first zone is different than the first flowrate of the steam to the first zone.

6. The control method of claim 5, wherein
the plurality of steam cooled zones further include a second zone;
the first distribution provides a first flowrate of the steam to the second zone; and
the second distribution provides a second flowrate of the steam to the second zone, and the second flowrate of the steam to the second zone is different than the first flowrate of the steam to the second zone.

7. The control method of claim 6, wherein
the second flowrate of the steam to the first zone is greater than the first flowrate of the steam to the first zone; and
the second flowrate of the steam to the second zone is greater than the first flowrate of the steam to the second zone.

8. The control method of claim 6, wherein
the second flowrate of the steam to the first zone is greater than the first flowrate of the steam to the first zone; and
the second flowrate of the steam to the second zone is less than the first flowrate of the steam to the second zone.

9. The control method of claim 5, wherein
the plurality of steam cooled zones further include a second zone;
the first distribution provides a first flowrate of the steam to the second zone; and
the second distribution provides a second flowrate of the steam to the second zone, and the second flowrate of the steam to the second zone is equal to the first flowrate of the steam to the second zone.

10. The control method of claim 1, wherein a first of the plurality of steam cooled zones comprises at least a portion of a fuel injector assembly.

11. The control method of claim 1, wherein a first of the plurality of steam cooled zones comprises at least a portion of a combustor bulkhead.

12. The control method of claim 1, wherein a first of the plurality of steam cooled zones comprises at least a portion of the inner wall or the outer wall of the combustor.

13. The control method of claim 1, wherein a first of the plurality of steam cooled zones comprises at least a portion of a stator vane array downstream of the combustion chamber.

14. The control method of claim 1, wherein
a first of the plurality of steam cooled zones comprises a first portion of a structure of the turbine engine about the combustion chamber; and
a second of the plurality of steam cooled zones comprises a second portion of the structure of the turbine engine about the combustion chamber.

15. The control method of claim 1, wherein
the operating of the turbine engine comprises injecting fuel into the combustor at a first flowrate during the first mode; and
the operating of the turbine engine comprises injecting fuel into the combustor at a second flowrate during the second mode, and the second flowrate is different than the first flowrate.

16. The control method of claim 1, wherein a first of the plurality of steam cooled zones is symmetrically cooled with the steam about a centerline during the operating of the turbine engine.

17. A control method, comprising:
operating a turbine engine, the turbine engine comprising a combustor section and a cooling system, the combustor section comprising a combustor and a combustion chamber extending radially within the combustor section between and to an inner wall of the combustor and an outer wall of the combustor, and the cooling system comprising a plurality of steam cooled zones arranged within the combustor section and about the combustion chamber, each of the steam cooled zones including a respective steam flow regulator and a respective portion of walls within the combustor;
injecting fuel into the combustion chamber, wherein the fuel is injected into the combustion chamber at a first flowrate during a first power setting, the fuel is injected into the combustion chamber at a second flowrate during a second power setting, and the second flowrate is different than the first flowrate;
combusting the fuel within the combustion chamber; and
distributing steam, using the respective steam flow regulators, between a plurality of steam cooled zones arranged about the combustion chamber to cool the respective portions of the walls within each zone, the plurality of steam cooled zones including a first zone and a second zone, wherein the steam is distributed according to a first ratio between the first zone and the second zone during the first power setting, wherein the first ratio specifies a first amount of steam to cool the portion of the walls in each zone according to first thermal loads in each zone during the first power setting, wherein the steam is distributed according to a second ratio between the first zone and the second zone during the second power setting, wherein the second ratio specifies a second amount of steam to cool the portion of the walls in each zone according to second thermal loads in each zone during the second power setting, and wherein the second ratio is different than the first ratio.

18. An assembly for a turbine engine, comprising:
a combustor comprising a combustion chamber;
a fuel system comprising a fuel injector assembly arranged with the combustor, the fuel system configured to inject fuel into the combustion chamber through the fuel injector assembly at a first flowrate during a first power setting and at a second flowrate during a second power setting, and the first flowrate different than the second flowrate; and
a cooling system including a plurality of steam cooled zones arranged about the combustion chamber, each of the steam cooled zones including a steam flow regulator and a portion of walls within the combustor, the cooling system configured to
 distribute steam, using the steam flow regulators, between the plurality of steam cooled zones to cool the portions of the walls within each zone, based on a first distribution during the first power setting, wherein the first distribution specifies a first amount of steam to cool the portion of the walls in each zone according to first thermal loads in each zone during the first power setting; and
 distribute the steam between the plurality of steam cooled zones based on a second distribution during the second power setting, wherein the second distribution specifies a second amount of steam to cool the portion of the walls in each zone according to second thermal loads in each zone during the second power setting, the second distribution different than the first distribution.

19. The assembly of claim 18, wherein a first of the plurality of steam cooled zones comprises a portion of the combustor.

20. The assembly of claim 18, further comprising:
a structure arranged with the combustor; and
a first of the plurality of steam cooled zones comprising at least a portion of the structure.

* * * * *